UNITED STATES PATENT OFFICE.

SAMUEL W. OSGOOD, OF CHICAGO, ILLINOIS, ASSIGNOR OF ONE-HALF TO A. J. JEWELL, OF CHICAGO, ILLINOIS.

PROCESS OF RECOVERING FLUE-DUST.

1,166,927.  Specification of Letters Patent.  Patented Jan. 4, 1916.

No Drawing.  Application filed June 22, 1914.  Serial No. 846,438.

*To all whom it may concern:*

Be it known that I, SAMUEL W. OSGOOD, a citizen of the United States, residing at Chicago, in the county of Cook and State of Illinois, have invented certain new and useful Improvements in Processes of Recovering Flue-Dust, of which the following is a specification.

My invention relates to an improved process for recovering flue dust resulting from the operation of blast furnaces by which the metallic iron contained in the flue dust may be cheaply and easily treated to unite the minute particles of iron into solid masses of any desired size so that the masses of iron thus formed may be introduced into a furnace and the iron recovered.

As is well known, in the operation of blast furnaces the blast of air introduced into the furnace to support the combustion required to melt and reduce the ore, in passing from the furnace carries with it a great deal of dust which is largely composed of iron oxid. This dust accumulates in large quantity in the discharge flue of the furnace, from which it must be removed at frequent intervals. Various means have been proposed for recovering the iron in this flue dust, but as far as I am aware, such recovery has always heretofore been attended with considerable complication and corresponding expense. By my process the recovery of the iron is effected so simply and cheaply that a considerable saving is realized, and the iron contained in the flue dust, which would otherwise be a waste product or recoverable only at a prohibitive expense, is available to form a part of the valuable product of the blast furnace.

In carrying out my process I take the flue dust as it comes from the discharge flue of the furnace and mix it into a stiff paste by adding water to it, and to this paste I may add, if required, a sufficient amount of lime, or other binder, to hold the mass together when it is dried. The resulting paste is then formed into globules or pellets which may be of any desired size and shape, and these are preferably permitted to dry and harden before proceeding to the next step in my process. In some cases it may be desirable to use other liquid than water for forming the paste, such, for example, as petroleum oil or coal tar by-product, and such of these liquids as are sticky and tenacious, as, for example, coal tar by-products, may be used without additional binder to form as large sized pellets as desired.

It will be understood that the masses of material thus formed contain considerable iron in the form of iron oxid, and to give these masses or globules a permanence and hardness sufficient to cause them to be operated upon subsequently in a proper manner in the blast furnace it is desirable to burn them by the application of intense heat, this heat being preferably in the form of a reducing flame. To accomplish this sintering step of my process I find it convenient and very effective to introduce the globules or pellets directly into the molten slag as it passes down the discharge trough from the furnace. This slag, as is well known, is rich in reducing gases which are given off in large quantity from the slag as it passes down the discharge trough. The amount of these gases thus given off is greatest, of course, near the furnace, and decreases as the distance from the furnace increases, so that by introducing the globules or pellets into the discharge trough at different points along its length different degrees of reduction of the material of the pellets are secured. The action of the molten slag upon the pellets is to immediately reduce them to sintered pellets or globules, with the result that the material of the pellets or globules is reduced, and, therefore, the iron in the globules or pellets is transformed nearly or quite into metallic iron, depending upon the amount of the reducing action of the gases coming into contact with the pellets or globules. The sintered pellets or globules are carried with the molten slag into a receptacle provided for the same, and may be recovered from the slag in any desired manner; as, for example, the slag may be broken up mechanically, or it may be run into or through water, which has the effect of granulating the slag, and in any case the hard metallic sintered pellets or globules are released from the slag, and may be subsequently separated therefrom in any desired manner. This may be accomplished by screening or by gravity separators, but I find the preferable means for accomplishing this step of my process is to subject the granulated slag to magnetic separation which will remove the sintered metallic pellets or globules from the remaining slag.

These sintered pellets or globules are hard and permanent as a result of the sintering operation, and may be introduced into the blast furnace with the other portions of the charging material, and the iron contained in the pellets or globules may readily be fused with the molten mass in the furnace, and thus form a part of the good iron which is drawn off from the furnace in the usual manner into the molds provided for the purpose.

In carrying out my process on a commercial scale it is desirable to locate the stock of the formed and dried pellets or globules in a suitable bin above the slag discharge trough, and to provide a trough from said bin which may readily convey the dried pellets or globules to the slag trough and introduce them at any desired point in said trough.

One of the advantages secured by using a liquid rich in carbon as the paste-forming liquid, as referred to above in connection with petroleum oil and coal tar by-product, is that the action of the heat upon the carbon when the pellets are subjected to the action of such heat forms paths or avenues between the particles of flue dust being treated so that the reducing gases may more easily and effectively penetrate the mass of the pellets. To further facilitate this action, other carbonaceous material, such as fine saw-dust, may be added to the paste which will increase the effect of providing these paths or avenues just mentioned when the pellets are subjected to the sintering heat. Another effect that may be noted resulting from the mixing of the flue dust with carbonaceous material and the subsequent formation of the openings or passages in the pellets is that when the pellets are subsequently placed in the furnace for recovering the iron in the pellets they are more easily melted than if they were in hard compact form. It is not necessary to use oil or coal tar by-product as a binder in order to secure the advantage of the carbonaceous material referred to for in making up the paste the binder may consist of lime, and saw-dust may be added to the paste to provide the necessary carbonaceous material, although the liquid employed for making the paste is water instead of the oil or coal tar by-product. The only consideration limiting and determining the size of the pellets or globules is the heat available for the sintering operation and the effective melting of the sintered pellets in the furnace. The pellets or globules should be taken of such a size that they are reduced or sintered to a sufficient extent by the action of the heat applied so that when the sintered pellets are subsequently introduced into the furnace to be melted there will be no free dust which will be blown through the furnace to require subsequent re-treatment.

While I have described the sintering operation as capable of performance by means of placing the pellets or globules in the molten slag being discharged from a furnace, it will be understood that the same sintering effect may be produced in carrying out my process by subjecting the pellets or globules to the action of the reducing gases in any other manner, as, for example, the pellets or globules may be placed in the gases as they are being delivered from the slag without being actually placed in the slag itself; or, again, piping may be provided for conveying the reducing gases to a point somewhat distant from the slag trough, and the reducing gases may there be used to sinter the pellets or globules.

A further manner in which the slag and sintered pellets may be separated from each other is by delivering the molten slag containing the sintered pellets over a powerful air blast, as is done in the production of so-called mineral wool, the effect of this operation being to blow the slag in finely divided fibrous condition some considerable distance from the point of application of the blast, where it may be collected and handled by automatic conveyers of any well known type, and delivered to any desired point. The sintered pellets, however, being much heavier and not broken up by the blast will drop by the action of gravity comparatively near the point of application of the blast, where they, too, may be collected and handled by automatic conveyers of any well known type and deposited by these conveyers in bins convenient for charging the furnace with the sintered pellets or globules.

In crushing the slag mechanically, as has commonly been done in the past for making road-making material of the slag, the sintered pellets may be separated from the crushed slag by screening or by magnetic separation, and the resulting crushed slag is available for use for any desired purpose, as, for example, for road-making, just as effectively as though the slag had not been employed to sinter the pellets.

While I have described my process as carried out by introducing the dried pellets or globules into the molten slag delivered from a furnace, it will be understood that the sintering operation may be accomplished by the application of any intense heat, and, further, that the degree of drying the pellets or globules is immaterial as long as they are sufficiently permanent to withstand the sintering operation. Furthermore, the amount and quantity of combining material employed may be varied under different conditions, the only requirement being that the particles of the globules or pellets shall cohere sufficiently to withstand the sintering operation without breaking up the pellets or globules.

While I have described my process as consisting in the operations above referred to, I desire to claim any equivalent operations which, when performed in substantially the manner referred to, will produce an equivalent result.

What I claim is:

1. The process of sintering flue dust, consisting in making pellets or globules of said dust, and subjecting said pellets or globules to a reducing flame.

2. The process of sintering flue dust, consisting in making a paste of the flue dust with a binding material, forming pellets or globules of the paste, drying said pellets or globules, and subjecting said pellets or globules to a temperature sufficient to sinter the same.

3. The process of sintering flue dust, consisting in making a paste of the flue dust with a binding material, forming pellets or globules of the paste, drying said pellets or globules, and subjecting said pellets or globules to a reducing flame.

4. The process of sintering flue dust, consisting in making a paste of the flue dust with a binding material, forming pellets or globules of the paste, drying said pellets or globules, and placing said pellets or globules in molten slag delivered from a furnace.

5. The process of sintering flue dust, consisting in forming pellets or globules of said dust, and placing said pellets or globules in molten slag delivered from a furnace.

6. The process of sintering flue dust, consisting in forming a paste of the flue dust, forming pellets or globules from said paste, and placing said pellets or globules in molten slag delivered from a furnace.

7. The process of sintering flue dust, consisting in making a paste of the flue dust with a binding material, forming pellets or globules of the paste, drying said pellets or globules, placing said pellets or globules in molten slag delivered from a furnace, breaking up the slag, and separating the sintered pellets from said slag.

8. The process of sintering flue dust, consisting in forming pellets or globules of said dust, placing said pellets or globules in molten slag delivered from a furnace, breaking up the slag, and separating the sintered pellets from said slag.

9. The process of sintering flue dust, consisting in forming a paste of the flue dust, forming pellets or globules from said paste, placing said pellets or globules in molten slag delivered from a furnace, breaking up the slag, and separating the sintered pellets from said slag.

10. The process of sintering flue dust, consisting in forming pellets or globules of said dust, and subjecting the pellets or globules to the action of hot reducing gases given off from slag delivered from a furnace.

11. The process of sintering flue dust, consisting in forming a paste of the flue dust, forming pellets or globules from said paste, and subjecting the pellets or globules to the action of hot reducing gases given off from slag delivered from a furnace.

12. The process of sintering flue dust, consisting in forming a paste of the flue dust with carbonaceous material, forming pellets or globules from said paste, and subjecting the pellets or globules to the action of hot reducing gases given off from slag deliverd from a furnace.

13. The process of sintering flue dust, consisting in making a paste of the flue dust with carbonaceous material, forming pellets or globules of the paste, and subjecting said pellets or globules to a sufficient heat to sinter the same.

14. The process of sintering flue dust, consisting in making a paste of the flue dust and carbonaceous liquid, forming pellets or globules of the paste, drying said pellets or globules, and subjecting said pellets or globules to a reducing flame.

15. The process of sintering flue dust, consisting in making a paste of the flue dust with coal tar by-product, drying said pellets or globules, and subjecting said pellets or globules to a heat sufficient to sinter the same.

16. The process of sintering flue dust, consisting in making a paste of the flue dust with coal tar by-product, drying said pellets or globules, and subjecting the pellets or globules to the action of the reducing gases given off from slag delivered from a furnace.

17. The process of sintering flue dust, consisting in making pellets or globules of said dust, placing said pellets or globules in molten slag delivered from a furnace, and separating the slag from the pellets by the action of an air blast.

In witness whereof, I hereunto subscribe my name this 17th day of June, A. D., 1914.

SAMUEL W. OSGOOD.

Witnesses:
A. J. JEWELL,
ALBERT C. BELL.